June 25, 1963

T. L. BRIGGS, JR 3,095,166

DUCTED FAN ENGINE

Filed March 12, 1958

INVENTOR
THOMAS L. BRIGGS, JR.
BY Vernon F. Hauschild
ATTORNEY

June 25, 1963
T. L. BRIGGS, JR
3,095,166
DUCTED FAN ENGINE
Filed March 12, 1958
3 Sheets-Sheet 2
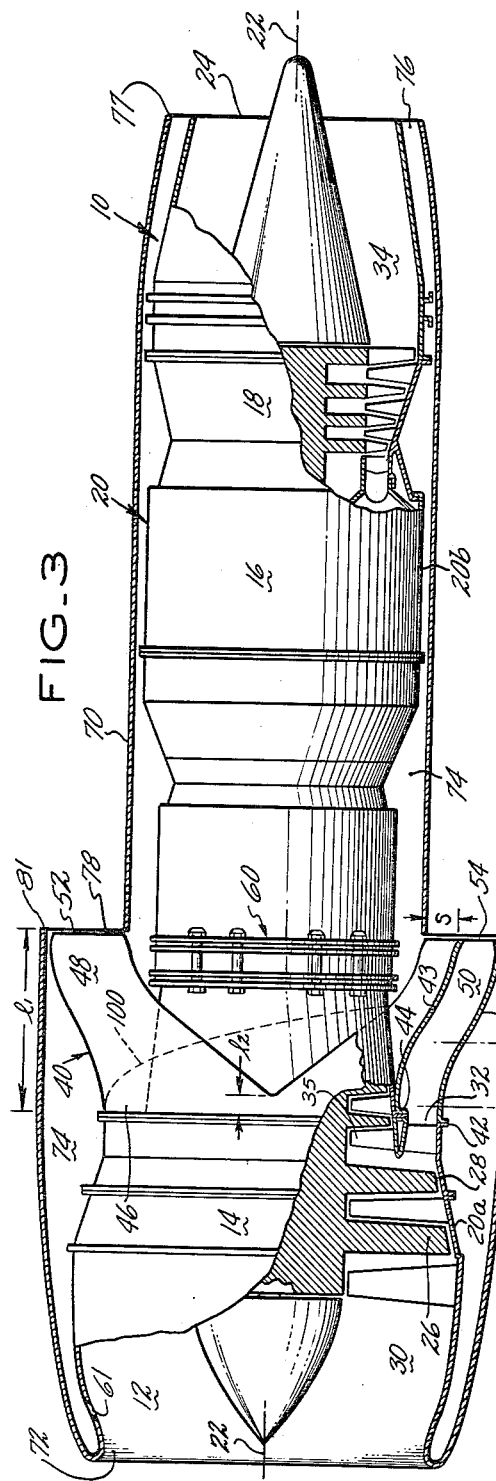
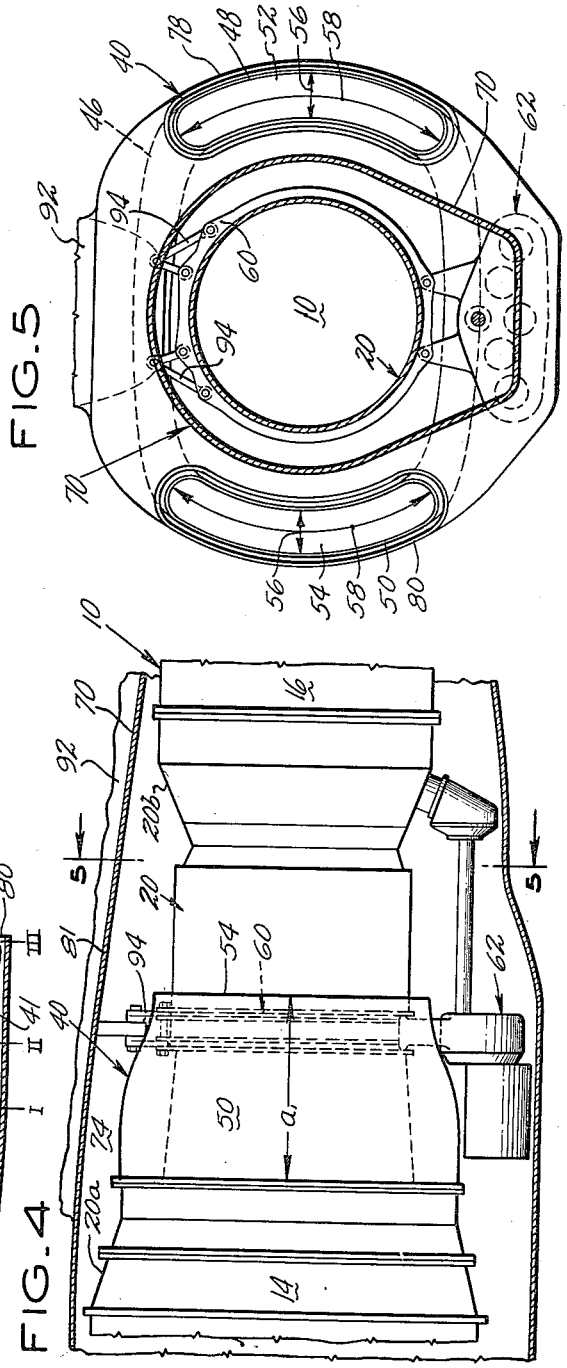
INVENTOR
THOMAS L. BRIGGS, JR.
BY Vernon F. Hauschild
ATTORNEY

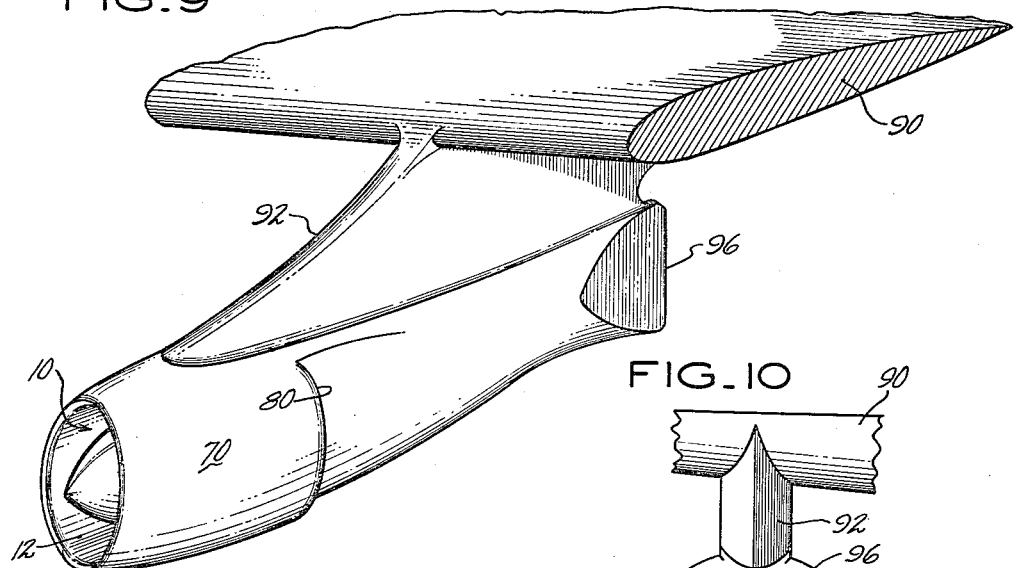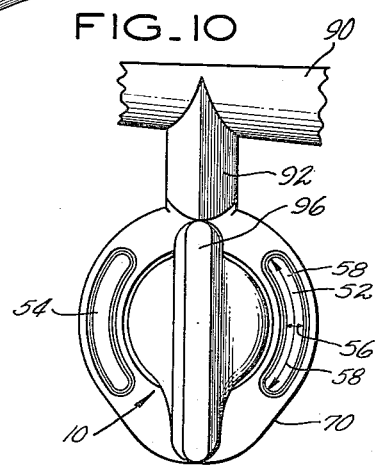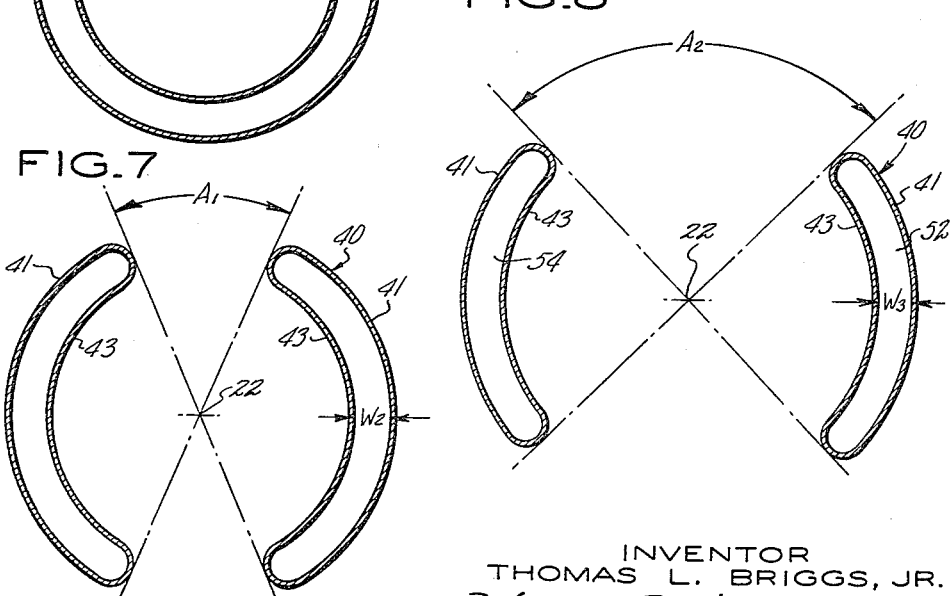

United States Patent Office 3,095,166
Patented June 25, 1963

3,095,166
DUCTED FAN ENGINE
Thomas L. Briggs, Jr., Manchester, Conn., assignor to United Aircraft Corporation, East Hartford, Conn., a corporation of Delaware
Filed Mar. 12, 1958, Ser. No. 720,961
3 Claims. (Cl. 244—53)

This invention relates to powerplants and more particularly to turbine fan engines of the type useable to propel modern aircraft.

In the past, it has not been possible to effectively utilize ducted fan engines as powerplants for modern aircraft because the extensive ducting systems used in conventional ducted fan engines are heavy in weight and completely envelop the remainder of the engine so that all accessibility to the engine through the airplane nacelle for required maintenance purposes is lost. Further, due to the engine ducting envelope in conventional ducted fan engines, severe problems are encountered in attempting to support the engine as the support means has to be passed through the engine enveloping duct, thereby destroying its gas tight quality. In addition to this, the flow losses encountered in passing the engine gases through the elongated conventional ducted fan passages of annular shape were such that the frontal area of the engine had to be increased to be able to receive sufficient air to compensate for these losses. The enveloping duct contouring necessary to enclose the normally externally mounted engine accessories increased the maximum engine radial dimension further. These increases in engine size necessitate corresponding increases in nacelle size so that the use of a conventional ducted fan engine greatly increases the size and weight of both the engine and airplane nacelle and the increased sizes are accompanied by all of the aerodynamic and drag losses normally caused thereby.

It is an object of this invention to teach a ducted fan engine construction which has all of the advantages of the usual ducted fan engine but which is light in weight, permits the use of a lightweight and small engine nacelle permits accessibility to the engine throughout most of the engine length and which permits both top and bottom vertical access to the engine for virtually the entire engine length so that the engine may be supported at the engine 12 (10—2 preferably) o'clock position, if desired, and so that the engine accessories may be externally mounted at the conventional engine 6 (4—8 preferably) o'clock position with full access thereto.

It is a further object of this invention to teach a ducted fan engine in which the amount of ducting used is minimal and which has an annular inlet and two discharge ducts of short axial dimension located on opposite sides of the engine, preferably at the 3 (2-4) o'clock and 9 (8—10) o'clock positions, and each converging and culminating in a nozzle defining a slot communicating with atmosphere and having its major axis extending primarily in a vertical direction for noise suppression and noise directivity purposes.

It is a further object of the invention to teach a ducted fan engine configuration in which the ducting unit comprises a bifurcated duct of short axial dimension and having an annular inlet and at least one and preferably two converging passages located on opposite sides of the engine and each leading from the inlet to a discharge nozzle comprising an elongated slot communicating with the atmosphere.

Other objects and advantages will be apparent from the specification and claims, and from the accompanying drawings which illustrate an embodiment of the invention.

FIG. 3 is a plan view, partially broken away and in section, of my ducted fan engine with an airplane nacelle shown in section therewith.

FIG. 4 is a fragmentary side view of my ducted fan engine configuration shown in FIG. 3.

FIG. 5 is shown of my ducted fan engine taken along line 5—5 of FIG. 4.

FIG. 6 is a cross-sectional duct unit showing through station I—I of FIG. 3.

FIG. 7 is a cross-sectional duct unit showing through station II—II of FIG. 3.

FIG. 8 is a cross-sectional duct unit showing through station III—III of FIG. 3.

FIG. 9 is a perspective showing of my ducted fan engine installed in an airplane nacelle and supported by a pylon or strut projecting from an aircraft wing.

FIG. 10 is a rear view of the FIG. 9 showing and illustrates a vertical slot exhaust outlet for a basic engine.

In a conventional turbojet aircraft engine, air passes through an aligned compressor, burner and turbine and is then discharged to atmosphere through an exhaust outlet to generate thrust. Generally speaking, a ducted fan engine adds the feature of taking a portion of engine air from an engine station such as the compressor and discharging it to atmosphere to generate thrust other than through the aforementioned exhaust outlet. In conventional ducted fan engine design, the additional duct is of circular cross section and envelops the engine to form an annular air passage therebetween. As explained more fully below, a ducted fan engine gives the advantage of increased thrust, increased propulsive efficiency and better fuel economy over a turbojet engine but, in the past, has had the disadvantage of engine non-accessibility and prohibitive engine and nacelle weight and size. These disadvantages prevented taking advantage of increased air flow through the turbofan engine beyond the air flow capacity of a conventional turbojet engine without reducing the airplane pay load capacity below a practical limit.

The accepted formula for calculated thrust generated by a jet-type engine is:

$$F_n = \frac{W_a}{g}(V_j - V_a) \qquad (1)$$

where $F_n$ is thrust, $W_a$ is air flow quantity, $V_j$ is the velocity of the jet and $V_a$ is the velocity of the airplane.
The formula for propulsive efficiency is:

$$N_p = \frac{2}{1+\frac{V_j}{V_a}} \qquad (2)$$

Figure 1:
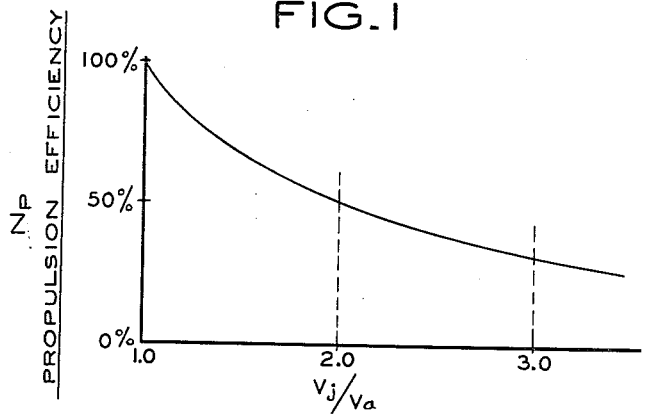
FIG. 1 is a graphic representation of engine propulsion efficiency ($N_p$) plotted against the ratio of jet velocity to airplane velocity ($V_j/V_a$).

It will be obvious by observing Formula 2 and the graph shown in FIG. 1 that optimum propulsive efficiency is attained when $V_j = V_a$. It will further be noted by referring to Formula 1 that, at this condition of optimum propulsive efficiency, no thrust is being generated by the engine. Accordingly, it is necessary to effect a compromise between propulsive efficiency and thrust generation, but such is easily accomplished for, by referring to Formula 1 we see that, by taking advantage of the inherently higher air-flow capacity of a ducted fan engine over a conventional turbojet engine, we may substantially reduce our jet velocity $V_j$ without thrust loss, and the advantage gained by the reduced jet velocity $V_j$ is increased propulsive efficiency as shown in FIG. 1 and Formula 2.

Figure 2:
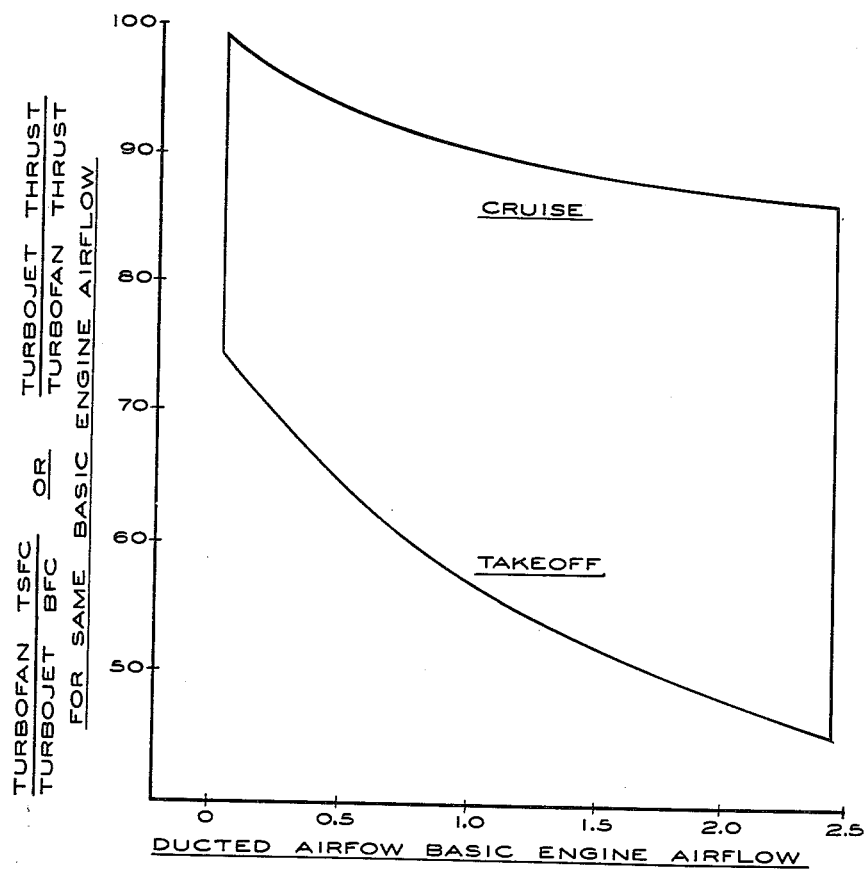
FIG. 2 is a graphic representation of a comparison of turbo-fan or ducted fan engine performance characteristics with similar performance characteristics of a conventional turbojet engine and includes comparisons of thrust and thrust specific fuel consumption.

Referring to FIG. 2 we see a comparison of turbofan or ducted fan engine thrust specific fuel consumption (TSFC) compared to conventional turbojet engine thrust specific fuel consumption and a further comparison of conventional turbojet engine thrust to turbofan engine thrust for the same basic or conventional engine air flow, both plotted against the ratio of ducted fan engine air flow to basic turbojet air flow. Thrust specific fuel consumption is defined as lbs. fuel/lbs. thrust/hour. FIG. 2 represents a curve envelope establishing limits at sea level and at 35,000 feet cruise altitude and clearly demonstrates the increased thrust and reduced fuel consumption available in a ducted fan engine compared to a conventional jet engine. Experience has shown that with a conventional ducted fan engine, the added weight and bulkiness of design required to exceed a ratio of ducted fan air flow to jet engine air flow of approximately 1:1, makes such an engine impractical so that the added advantage of increased thrust and fuel economy by going to flow ratios of 1.5 and 2.0 cannot be obtained practically with conventional ducted fan engine design. As mentioned supra, it is an important object of this invention to teach a turbofan engine construction which permits taking advantage of the increased air flow ratios of 1.5 and 2.0 to obtain increased thrust and fuel economy without sacrificing substantial weight, size and its attendant efficiency reduction, and engine accessibility which is essential to engine service, maintenance and repair.

An embodiment of my ducted fan engine configuration is shown in FIGS. 3, 4 and 5. Engine unit 10 comprises air inlet section 12, plural stage compressor section 14, burner or combustion section 16, and turbine section 18. Compressor 14, burner 16 and turbine 18 are aligned coaxially within engine outer case 20 which is preferably of circular cross section and concentric about engine axis 22. Outer case 20 defines air inlet section 12 at its forward or upstream end, and engine exhaust gas discharge or outlet 24 at its after or downstream end, through which engine exhaust gases are discharged to atmosphere to generate thrust. Engine outer case 20 is made up basically of a first section 20a which is of enlarged diameter with respect to second section 20b, to envelop the enlarged compressor stages 26 and 28 which are located at the forward end of compressor 14, so that the first section 20a defines a first gas passage 30 therewithin. The second section 20b of engine outer case 20 constitutes an axial extension of first section 20a but is of lesser diameter such that an annular aperture 32, which lies substantially in a radial plane is defined therebetween. Second section 20b of outer case 20 defines a second gas passage 34 having an annular inlet 35 which is of substantially the same area as aperture 32 and which culminates in exhaust outlet 24, therewithin. Bifurcated air discharge duct or duct bleed unit 40, which will be described in greater detail hereinafter, is attached to engine outer case 20 by any convenient means such as mating flange units 42 and 44 which may be connected by the conventional nut and bolt method.

With this engine construction, air enters the engine unit 10 at air inlet section 12 with ram boost during flight operation and is compressed by the enlarged compressor stages such as 26 and 28, for example, in passing through first gas passage 30. The compressed gases leaving first gas passage 30 flow in approximately equal proportion either into bifurcated duct unit 40 for discharge to atmosphere therethrough to generate thrust or into second gas passage 34 in which the gases are further compressed in passing through the the remainder of compressor 14, are heated in passing through burner section 16, have energy extracted therefrom in passing through turbine 18 and are eventually discharged to atmosphere through exhaust outlet 24 thereby generating thrust.

Engine unit 10 is preferably constructed in the fashion taught in U.S. Patent Nos. 2,711,631 and 2,747,367, to which reference is hereby made, and differs therefrom basically only in that it has one or more enlarged compressor stages such as 26 and 28 at the compressor forward end, bifurcated duct unit 40, and preferably at least one additional turbine stage to drive the enlarged compressor 14 and an enlarged exhaust outlet 24 to permit increased air flow through the engine.

Bifurcated duct unit 40 is preferably a unitary sheet metal member and comprises an annular inlet section 46 which is defined between outer wall 41 and inner wall 43 and which is attached to engine outer case 20 in sealed relation and positioned and sized to receive the engine compressed gases from the first gas passage 30 which pass through aperture 32. Unit 40 has a smooth exterior and interior and is of short axial dimension or length $l_1$ with respect to the corresponding axial dimension or length of engine outlet case 20, preferably terminating forward of burner section 16, while the annular inlet section 46 thereof is of virtually insignificant axial dimension $l_2$. Unit 40 is hollow and preferably comprises unobstructed ducts 48 and 50 which are located on opposite and preferably lateral sides of engine unit 10 so as to be in the engine 3 (2—4 preferably) o'clock and 9 (8—10 preferably) o'clock positions. Ducts 48 and 50 define convergent flow and each smoothly project from annular inlet section 46 rearwardly or downstream and culminate in rearwardly directed slot shaped nozzles 52 and 54, respectively. Slots 52 and 54 each have a minor axis 56 (FIG. 5) which extends substantially horizontally and a major axis 58 which extends primarily vertically. The major axis 58 of slots 52 and 54 would preferably extend precisely vertically for maximum noise intensity directivity purposes and will preferably be dimensioned so that the ratio of major axis 58 to minor axis 56 is optimum for noise supression purposes as fully explained in U.S. application Serial No. 712,418.

An understanding of the contouring of bifurcated duct 40 can be obtained by viewing FIGS. 6, 7 and 8. FIG. 6 constitutes a duct showing through station I of FIG. 3 and roughly represents duct annular inlet 32 defined between duct outer wall 41 and duct inner wall 43. FIG. 7 represents a showing through station II of FIG. 3, and it will be noted that diametrically opposed equal arc segment duct separations, designated as arc $l$, exist between the two duct segments formed between outer wall 41 and inner wall 43. FIG. 8 represents a section through station III of FIG. 3, and it will be noted that larger diametrically opposed arc separations, arc 2, exist between the duct segments defined by outer wall 41 and inner wall 43 which, at this station, define outlet slots 52 and 54. The duct widths, represented as W1, W2 and W3, increase slightly with each succeeding downstream station I, II and III, but since the separating arc is increasing at a more pronounced rate, the end result is a reduction in the flow area in a downstream direction so that unit 40 constitutes a convergent nozzle to insure optimum discharge flow conditions for thrust generation. It will be noted by viewing FIG. 3 that discharge slots 52 and 54 are spaced a substantial distance, "s," from nacelle 70 to insure that the jet blasts therethrough do not adversely affect the nacelle. Obviously, the spacing required will vary with the type of aircraft on which this installation is made.

A side view of duct unit 40 is shown in FIG. 4 while a rear view is shown in FIG. 5. It will be noted by reference to FIGS. 3, 4 and 5 that duct unit 40, due to its short axial dimension $l_1$, envelops a very minor portion of engine outer case 20 and due to the minute axial dimension $l_2$ of inlet section 46, coupled with the lateral positioning of ducts 48 and 50 gives virtually complete top and bottom vertical access to engine outer case 20. For field maintenance purposes it is essential that access be had to engine outer case 20 to permit replacement, repair and service of the engine parts located therein. The extremely short axial dimenstion $l_1$ of unit 40 at the 12 o'clock and 6 o'clock positions is of particular advantage for it permits any convenient engine support or attachment means such as link unit 94 to engage engine outer case 20 at mounting flange unit 60, preferably at the 12 (10—2) o'clock position and further permits the externally mounted engine accessory unit 62 to be nestled between ducts 48 and 50 while attached to engine outer case 20 at the 6 (4—8 o'clock) position.

Airplane nacelle 70 is shown in cross section in FIGS. 3, 4 and 5 enveloping engine unit 10 and extending the full length thereof. The nacelle 70, in well-known fashion, is made partially or fully removable externally to permit access to engine 10. Nacelle 70 has air inlet section 72 which corresponds in position with air inlet section 12 of engine 10 and coacts therewith to define a part of first gas passage 30 and has a hollow interior so that, if desired, it may be used to form ram air cooling gas passage or cavity 74 between the exterior of engine outer case 20 and the interior of airplane nacelle 70, through which cooling air is passed to cool such important structural members as the engine outer case 20 and the accessory unit 62, lube oil sumps and so forth. If the cooling air passage configuration is used, ram air enters nacelle air inlet 72, passes over engine outer case first section 20a and bleed unit 40, then over engine outer case second section 20b to be discharged to atmosphere through annular outlet 76 formed between the nacelle outlet 77 and outer case outlet 24. It should be noted that in the FIGS. 3–5 configuration, nacelle 70 is of substantially reduced size downstream of duct unit 40 and provides outlet apertures 78 and 80 at nacelle transition section 81 to permit duct unit slots 52 and 54 to communicate with the atmosphere. Nacelle 70 is of smooth exterior surface to provide minimum drag in flight and is of any convenient cross-sectional shape to properly engulf or envelope engine unit 10 and will preferably be of substantially oval cross section as shown in FIG. 5 on installations having exterior mounted accessories at the engine 6 (4—8) o'clock position.

FIGS. 9 and 10 illustrate my FIG. 3–5 embodiment installed in a modern aircraft airplane to illustrate how this ducted fan engine configuration lends itself to aerodynamic installation, with maximum utility. Substantially horizontally projecting aircraft wing 90 serves to position and support vertically extending and air foil shaped engine support strut or pylon 92 which projects downwardly therefrom to support engine unit 10 within engine nacelle 70. Since all services furnished engine 10 by the airplane, such as fuel, and all services furnished the airplane by engine 10, such as compressed air for passenger comfort at altitude, passes through vertical strut 92 to wing 90, it is imperative that vertical access exists between strut 92 and engine 10 and such is an important contribution of my invention. In addition to service lines of the type mentioned, engine support means such as link units 94 extend in pairs between engine mounting flange unit 60 and engine support strut 92 to permit support of engine 10 by strut 92. In the FIGS. 9 and 10 configurations, the exhaust gas discharge section 96 is shown shaped as a vertically extending slot for noise suppression purposes as fully described in U.S. application Serial No. 712,418, in preference to the usual circular exhaust nozzle 24 shown in the FIGS. 3–5 embodiment. My ducted fan engine construction and its substantially vertically extending bleed slots 52 and 54, particularly when installed in an engine configuration utilizing a vertical engine support strut such as 92, is particularly adaptable to use from a flight aerodynamic and drag reduction standpoint, with the vertical slot exhaust outlet 96, thereby gaining a noise reduction advantage in addition to all other advantages obtained by the use of my ducted fan engine, described supra. It will be noted by viewing FIGS. 9 and 10 that vertical exhaust outlet 96 aligns with vertical strut 92 and smoothly blends in exterior surfaces with strut 92 and engine nacelle 70 so that no drag creating surfaces are formed thereby.

It will be obvious to those skilled in the art that for side mounted engine installations, ducts 48 and 50 may extend along the top and bottom (12 and 6 o'clock) of engine 10 to give lateral (3 and 9 o'clock) access to engine 10. Further, air discharge unit 40 may be fabricated as shown along dotted line 100 of FIG. 3 so that annular inlet 46 joins a single duct such as 50 where installation problems dictate.

It will further be apparent that if conditions dictate, nacelle 70 could be fabricated to completely enclose engine unit 10 and duct unit 40 so that the air from unit 40 discharges within the cavity formed between engine 10 and nacelle 70.

It is to be understood that the invention is not limited to the specific embodiment herein illustrated and described but may be used in other ways without departure from its spirit as defined by the following claims.

I claim:

1. A by-pass jet engine having an axis and an outer housing with an air inlet section at its forward end and an exhaust gas discharge section at its after end, a plural stage compressor and a turbine operatively connected and in spaced axial relation within said housing, a burner in axial alignment with and positioned between said compressor and turbine within said housing so that air enters said air inlet section, is compressed in passing through said compressor, is heated in passing through said burner, has energy extracted therefrom in passing through said turbine and is discharged through said discharge section to atmosphere as pressurized and heated exhaust gas to generate thrust, said compressor having at least one enlarged stage at its forward end, said housing being constructed in two sections with a first section having an inlet and an outlet and being enlarged to envelop said enlarged compressor stage only and defining a first gas passage therewithin and with a second section having an inlet aligned radially with said first section outlet and being reduced in size from said first section so that an annular aperture is defined between the housing sections and with said second section defining a second gas passage therewithin extending from said enlarged compressor stage to said discharge section, said second gas passage having an inlet area substantially equal to the area of said annular aperture a hollow bifurcated duct unit of substantially shorter axial dimension than said outer housing and having an annular inlet section attached to said housing aperture and separating into ducts in convergent flow and positioned on laterally opposite sides of said engine and each culminating in a nozzle through which the air which enters said duct until inlet section from said first gas passage is discharged as pressurized air to generate thrust, and an engine nacelle enveloping said engine outer housing in spaced radial relation to form a cooling air passage therebetween and extending from said air inlet section to said discharge section, said nacelle having a smooth exterior and being enlarged at its forward end to enclose said enlarged compressor stage and duct unit then reducing in cross-sectional area through a transition section to enclose said second section of said outer housing in close proximity, said transition section defining apertures in which said ducts are received to place said duct unit nozzles into communication with atmosphere.

2. A vertical engine support strut extending downwardly from an aircraft and being of airfoil shape, a jet engine having an axis and an outer housing with an air inlet section at its forward end and an exhaust gas discharge section at its after end defining a vertical slot discharge nozzle which aligns with said vertical strut, a plural stage compressor and a turbine operatively connected and in spaced axial relation within said housing, a burner in axial alignment with and positioned between said compressor and turbine within said housing so that air enters said air inlet section, is compressed in passing through said compressor, is heated in passing through said burner, has energy extracted therefrom in passing through said turbine and is discharged through said discharge section to atmosphere as pressurized and heated exhaust gas to generate thrust, said compressor having at least one enlarged stage at its forward end, said housing constructed in two sections with a first section enlarged to envelop said enlarged compressor stage only and defining a first gas passage therewithin and with a second section reduced in size from said first section so that an annular aperture is defined between the housing sections and with said second section defining a second gas passage therewithin extending from said enlarged compressor stage to said discharge section, a bifurcated duct unit of short axial dimension with respect to said outer housing having an annular inlet section attached to said housing aperture and separating into ducts positioned on laterally opposite sides of said engine and each defining convergent flow and culminating in a slot shaped nozzle having a primarily vertical major axis through which nozzle the air which enters said duct unit inlet section from said first gas passage is discharged as pressurized air to generate thrust, and an engine nacelle enveloping said engine outer housing in spaced radial relation to define a cooling air cavity therebetween and extending from said air inlet section to and smoothly blending with said discharge section, said nacelle having a smooth exterior and being enlarged at its forward end to enclose said enlarged compressor stage and duct unit then reducing in cross-sectional area through a transition section to enclose said second section of said outer housing in close proximity, said transition section defining apertures in which said ducts are received to place said duct unit nozzles into communication with atmosphere, said engine nacelle being at least partially removable, engine accessories located in said cooling air cavity between said ducts and attached to the bottom of said outer housing, engine mount means attached to said strut and extending between said ducts and attached to the top of said outer housing to support said engine.

3. In a jet engine having an axis and an outer housing with an air inlet section at its forward end and an exhaust gas discharge section at its after end, a plural stage compressor and a turbine operatively connected and in spaced axial relation within said housing, a burner between said compressor and turbine within said housing so that air enters said air inlet section, is compressed in passing through said compressor, is heated in passing through said burner, has energy extracted therefrom in passing through said turbine and is discharged through said discharge section to atmosphere as pressurized and heated exhaust gas to generate thrust, said compressor having at least one enlarged stage at its forward end, said outer housing being constructed in first and second sections with said first section having a forward end defining said air inlet section and an after end and being enlarged to envelop said enlarged compressor stage only and defining a first gas passage therewithin and with said second section reduced in radial dimension from said first section and having an after end defining said discharge section and a forward end positioned substantially radially inward of said first section after end so that an annular aperture is defined therebetween and with said second section defining a second gas passage therewithin extending from said enlarged compressor stage to said discharge section, said annular aperture being approximately half the area of said air inlet section, and a hollow duct air discharge unit of short axial dimension with respect to said outer housing having an annular inlet section attached to said housing aperture and separating immediately into at least one duct extending axially along said engine to permit access to said outer housing and each such duct culminating in a nozzle through which the air which enters said air discharge unit inlet section from said first gas passage is discharged as pressurized air to generate thrust.

References Cited in the file of this patent

UNITED STATES PATENTS

| 1,949,041 | Lagabbe | Feb. 27, 1934 |
| 2,444,318 | Warner | June 29, 1948 |
| 2,651,172 | Kennedy | Sept. 8, 1953 |
| 2,781,634 | Moore | Feb. 19, 1957 |
| 2,912,188 | Singelmann et al. | Nov. 10, 1959 |

FOREIGN PATENTS

| 672,660 | Great Britain | May 21, 1952 |
| 744,196 | Great Britain | Feb. 1, 1956 |

OTHER REFERENCES

Jane's "All the World's Aircraft," 1955–1956, page 225.
Journal of the Helicopter Association of Great Britain, vol. 9, No. 3, January, 1956, pages 404–410.